United States Patent [19]
Isemura et al.

[11] Patent Number: 5,940,543
[45] Date of Patent: *Aug. 17, 1999

[54] IMAGE COPYING APPARATUS FOR RECORDING MULTIPLE IMAGES IN COMPOSITE FORM

[75] Inventors: Keizo Isemura, Koganei; Yoshihiko Suzuki, Tokyo; Satoru Kutsuwada, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/545,317

[22] Filed: Oct. 19, 1995

[30] Foreign Application Priority Data

Nov. 11, 1994 [JP] Japan ................................... 6-302862

[51] Int. Cl.⁶ ................................................... H04N 1/387
[52] U.S. Cl. ............................ 382/284; 358/450; 358/448
[58] Field of Search ....................... 358/400, 404, 358/450, 451, 452, 453, 448; 382/284; 399/374, 375, 383, 384; H04N 1/387

[56] References Cited

U.S. PATENT DOCUMENTS

| | | | |
|---|---|---|---|
| 4,672,462 | 6/1987 | Yamada | 358/280 |
| 4,855,790 | 8/1989 | Suzuki | 355/24 |
| 5,231,516 | 7/1993 | Kamon et al. | 358/449 |
| 5,289,570 | 2/1994 | Suzuki | 358/452 |
| 5,309,245 | 5/1994 | Hayashi et al. | 358/450 |
| 5,396,344 | 3/1995 | Kimura et al. | 358/444 |
| 5,604,579 | 2/1997 | Kushida | 358/452 |
| 5,801,837 | 9/1998 | Hamanaka et al. | 358/450 |

*Primary Examiner*—Kim Yen Vu
*Attorney, Agent, or Firm*—Fitzpatrick, Cella, Harper & Scinto

[57] ABSTRACT

When images on the front and rear sides of multiple originals are reduced in size and recorded onto both sides of a single recording sheet in composite form, recording positions of images on the front and rear sides of each original are determined such that reduced images on the front side of the original are recorded on the front side of the recording sheet and reduced images on the rear side of the same original are recorded at corresponding positions on the rear side of the recording sheet. As a result, when the recording sheet is cut into pieces corresponding to respective recorded images, images on the front and rear sides of each cut piece of the recording sheet respectively agree with images on the front and rear sides of each original.

10 Claims, 7 Drawing Sheets

FOUR DOUBLE-SIDED ORIGINALS

FRONT SIDE

REAR SIDE

DOUBLE-SIDED LAYOUT OF TWO ORIGINALS

FRONT LAYOUT   REAR LAYOUT

DOUBLE-SIDED LAYOUT OF FOUR ORIGINALS

FRONT LAYOUT   REAR LAYOUT

FOUR DOUBLE-SIDED ORIGINALS

FOUR DOUBLE-SIDED ORIGINALS

IMAGE COPYING APPARATUS FOR RECORDING MULTIPLE IMAGES IN COMPOSITE FORM

BACKGROUND OF THE INVENTION

1. Field of the Invention

The present invention relates to an image copying apparatus for recording multiple original images in composite form.

2. Description of the Related Art

A well-known type of copying apparatus disclosed in, for example, U.S. patent application Ser. No. 07/835,973, now U.S. Pat. No. 5,475,475 records multiple original images at different positions on a single recording sheet in reduced size.

However, this application does not teach the recording of images from multiple double-sided originals onto both sides of a recording sheet.

When such a copying apparatus sequentially reads images from both sides of multiple double-sided originals and records the images onto both sides of a single recording sheet in composite form, images on the front and rear sides of one original may be copied on the same side of the recording sheet. In this case, if the recording sheet is cut into pieces corresponding to respective copy images, images on the front and rear sides of each cut piece of the recording sheet do not correspond with images on the front and rear sides of the original.

SUMMARY OF THE INVENTION

An object of the present invention is to provide a copying apparatus which eliminates the above disadvantage.

Another object of the present invention is to provide a copying apparatus which records images of multiple double-sided originals at different positions on both sides of a recording sheet.

A further object of the present invention is to provide a copying apparatus which copies images of multiple double-sided originals onto a recording sheet so that, when the recording sheet is cut into pieces corresponding to respective images, images on both sides of each cut piece agree with images on both sides of each original.

In accordance with these objects, there is provided a copying apparatus with a document feeder for transporting an original document to an exposure position, the document feeder including means for turning the original upside down, a reader for reading the image from the original document at the exposure position, a memory for storing the images so read, an image forming device for recording onto both sides of a recording sheet the images from the front and rear sides of the originals, and a determining means for determining layouts of the images from the front and rear sides of the multiple originals on the recording sheet so that images from the front and rear sides of each of the multiple originals are respectively recorded at corresponding positions on the front and rear sides of the recording sheets.

Other objects of the present invention will become more apparent from the following description of the preferred embodiment taken in conjunction with the accompanying drawings and the appended claims.

DESCRIPTION OF THE PREFERRED EMBODIMENT

A preferred embodiment of an image copying apparatus according to the present invention will now be described in conjunction with the accompanying drawings.

Overall Configuration of the Apparatus

Figure 1:
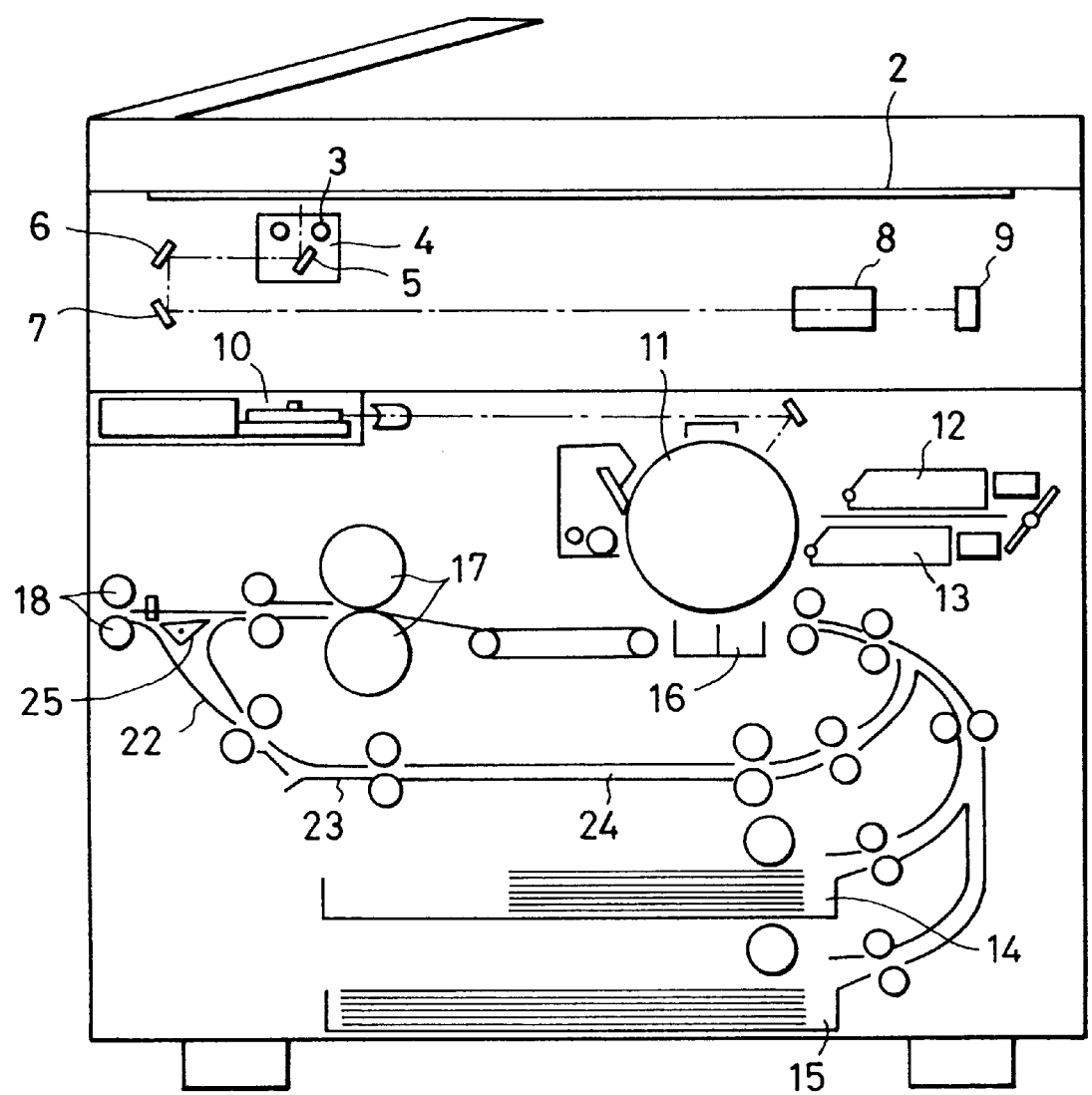
FIG. 1 is an explanatory view schematically showing the configuration of an image copying apparatus according to an embodiment of the present invention.

FIG. 1 is an explanatory view schematically showing the configuration of an image copying apparatus according to an embodiment of the present invention. Referring to FIG. 1, when a copy start key of an operation panel is pressed, a lamp 3 illuminates, and a scanner unit 4 moves horizontally to scan an original laid on a document platen glass 2. Reflected light from the original is reflected by mirrors 5, 6 and 7, passes through a lens 8, and forms an image in an image sensor 9.

The image sensor 9 generates a signal that is processed by a CPU circuit 37, which will be described later, and the processed signal is directly input to an exposure controller 10, or input to the exposure controller 10 after stored in an image memory 35.

The exposure controller 10 irradiates a photoconductor 11 with a lightwave signal modulated according to the input image signal. A latent image formed on the photoconductor 11 by this irradiation is developed by developing devices 12 and 13. A transfer sheet is transported from a transfer sheet loader 14 or 15, and the developed toner image is transferred onto the transfer sheet by a transfer device 16. The transferred toner image is fixed onto the transfer sheet by a fixing device 17, and then, ejected outside by a sheet discharging device 18. When a double-sided copy mode is set, the transfer sheet is directed by a flapper 25 to double-sided sheet conveyor paths 22, 23 and 24.

Figure 2:
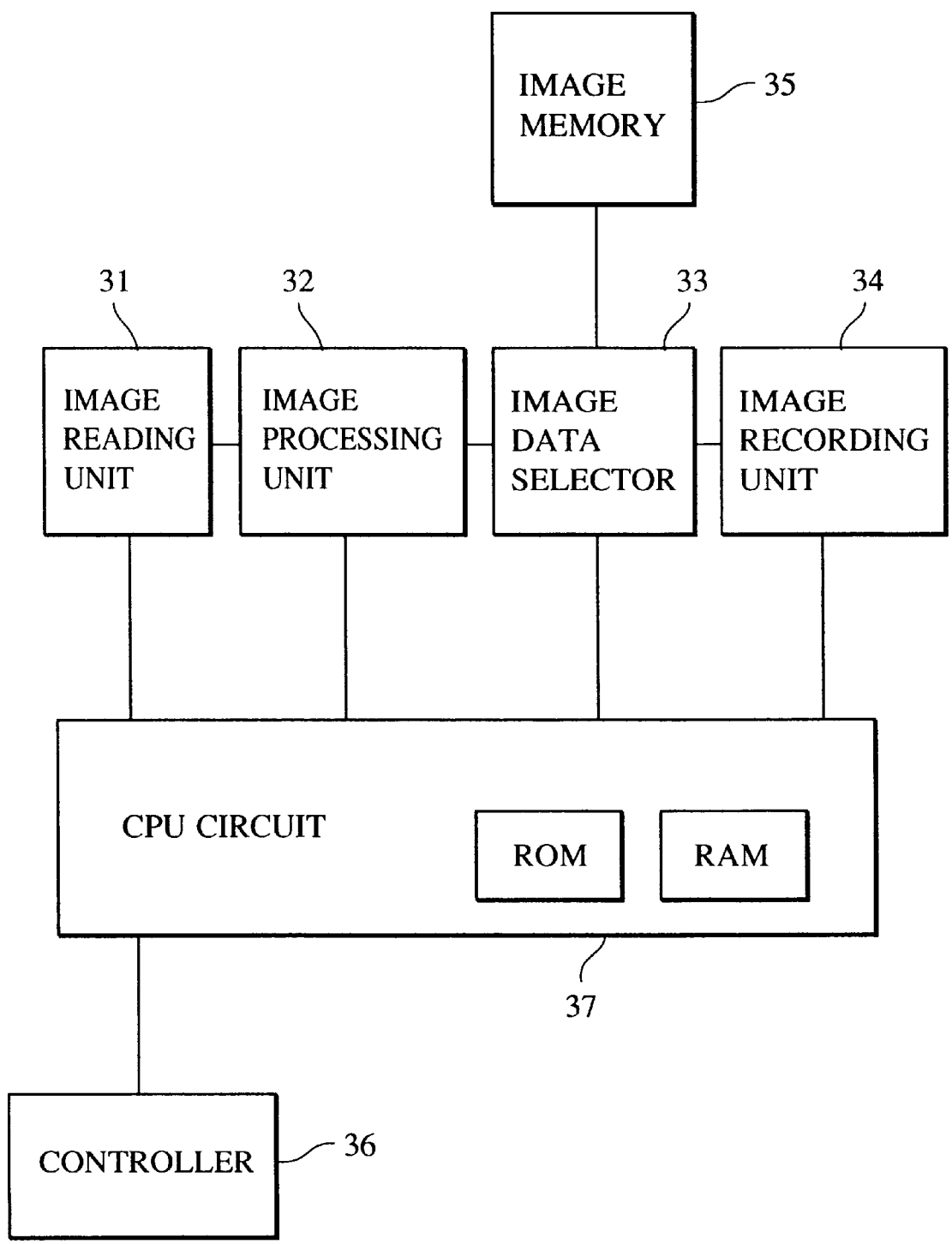
FIG. 2 is a block diagram showing an electric configuration of the image copying apparatus.

FIG. 2 is a block diagram showing an electronic configuration of the image copying apparatus. An image reading unit 31 comprises an optical system for inputting light reflected from the image on an original, a CCD as the image sensor 9 for converting the reflected light from the optical system into analog signals, and an A/D converter for converting the analog signals from the CCD into digital signals. The image reading unit 31 reads an image on an original and transmits data corresponding to the read image to an image processing unit 32.

The image processing unit 32 comprises a shading correction circuit, a color density conversion circuit, and an image editing circuit for performing edits, such as zooming, shift and ornament of images, according to designation from a user. The image processing unit 32 corrects and edits an image input from the image reading unit 31 and transmits the image to an image recording unit 34 or the image memory 35 through an image data selector 33.

The image data selector 33 comprises a data bus switching circuit for switching between a bus for transmitting the image data sent from the image processing unit 32 to the image recording unit 34 and a bus for transmitting the image data to the image memory 35, all according to instructions from the CPU circuit 37. The image data selector 33 also has a synthesizing circuit for performing switching and synthesis of image data sent from the image processing unit 32 and image data read out from the image memory 35.

The image recording unit 34 makes a copy of the image on a recording sheet in accordance with density signals of the image data transmitted from the image data selector 33.

The CPU circuit 37 for controlling the entire apparatus comprises a ROM for storing a control program, an error handling program and the like, a RAM used as work areas for various programs, various timer controllers and the like.

A controller 36 comprises various keys used to designate image edits of the image processing unit 32, and image copying settings, such as the number of copies to be made and the copy magnification ratio, a display for displaying the current setting, and the like.

Description of Controller 36

Figure 3:
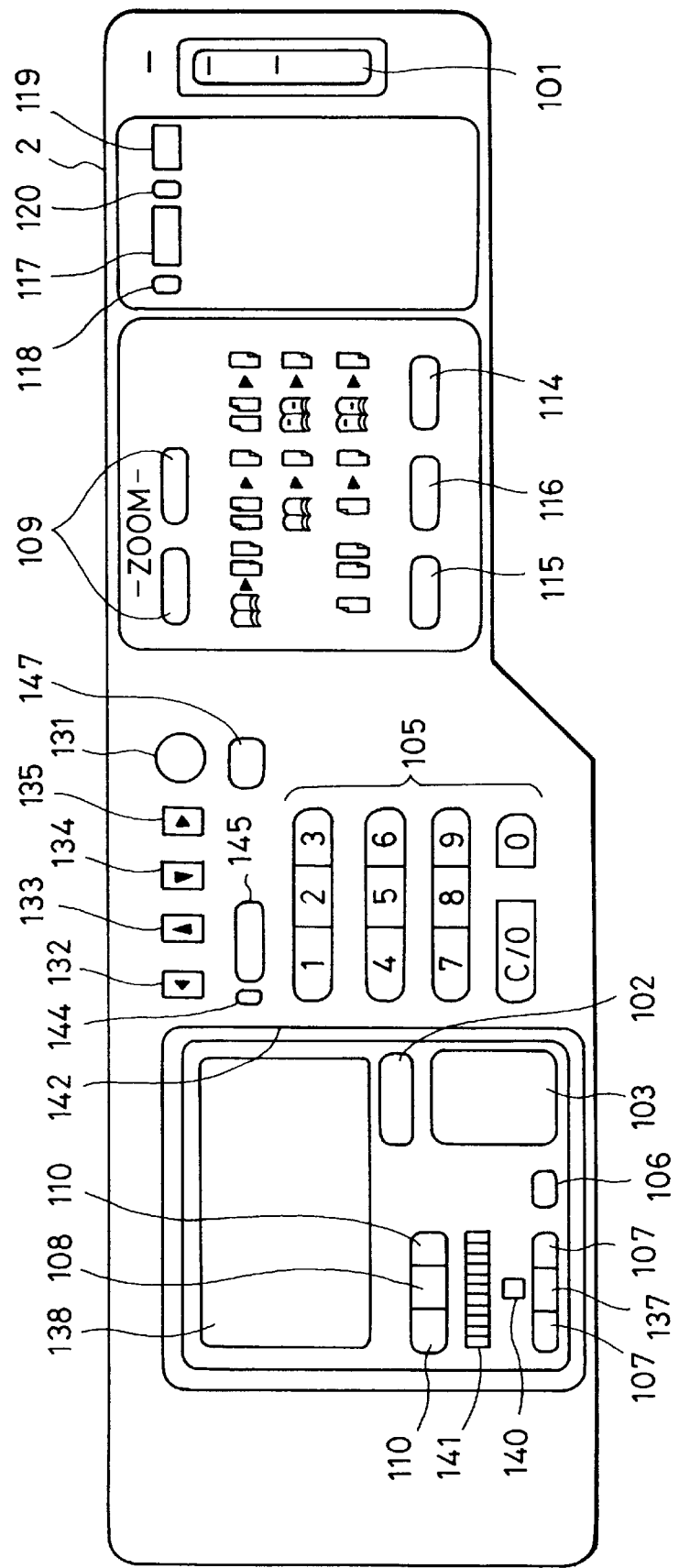
FIG. 3 is a front view showing a control panel of the controller shown in FIG. 2.

FIG. 3 is a front view showing an outward appearance of the controller 36. Various kinds of keys and a dot-matrix display 138 such as a liquid crystal display are arranged on the control panel.

The liquid crystal display 138 displays the state of the apparatus, the number of copies to be made, the copy magnification ratio, the selected sheet size and various operations instructions, and is controlled by control keys 131 to 135. A start key 103 starts a copying operation, a reset key 102 returns a set mode to a normal mode, and a group of keys 105 include ten keys, 0 to 9, used to input the number of copies to be made, the zoom ratio and the like and a clear key for clearing the input. Keys 107 are used to adjust the copy darkness, and the darkness adjusted by the keys 107 is displayed on a display 141.

A key 137 and a display 140 are a key for switching the on/off of an automatic darkness control function, and a display corresponding thereto. A key 106 selects one of sheet loaders or an automatic sheet selecting function, and the selection state is displayed on the liquid crystal display 138.

A key 108, keys 110 and a key 109 function as a direct copy key, reduction and enlargement keys and a zoom key for changing the copy ratio in 1% increments or decrements, respectively. A key 117 and a display 118 are a key for setting an automatic magnification mode and a display corresponding thereto, and the set condition is also displayed on the liquid crystal display 138.

Double-Sided Image Combination Mode for Double-Sided Originals

Figure 4:
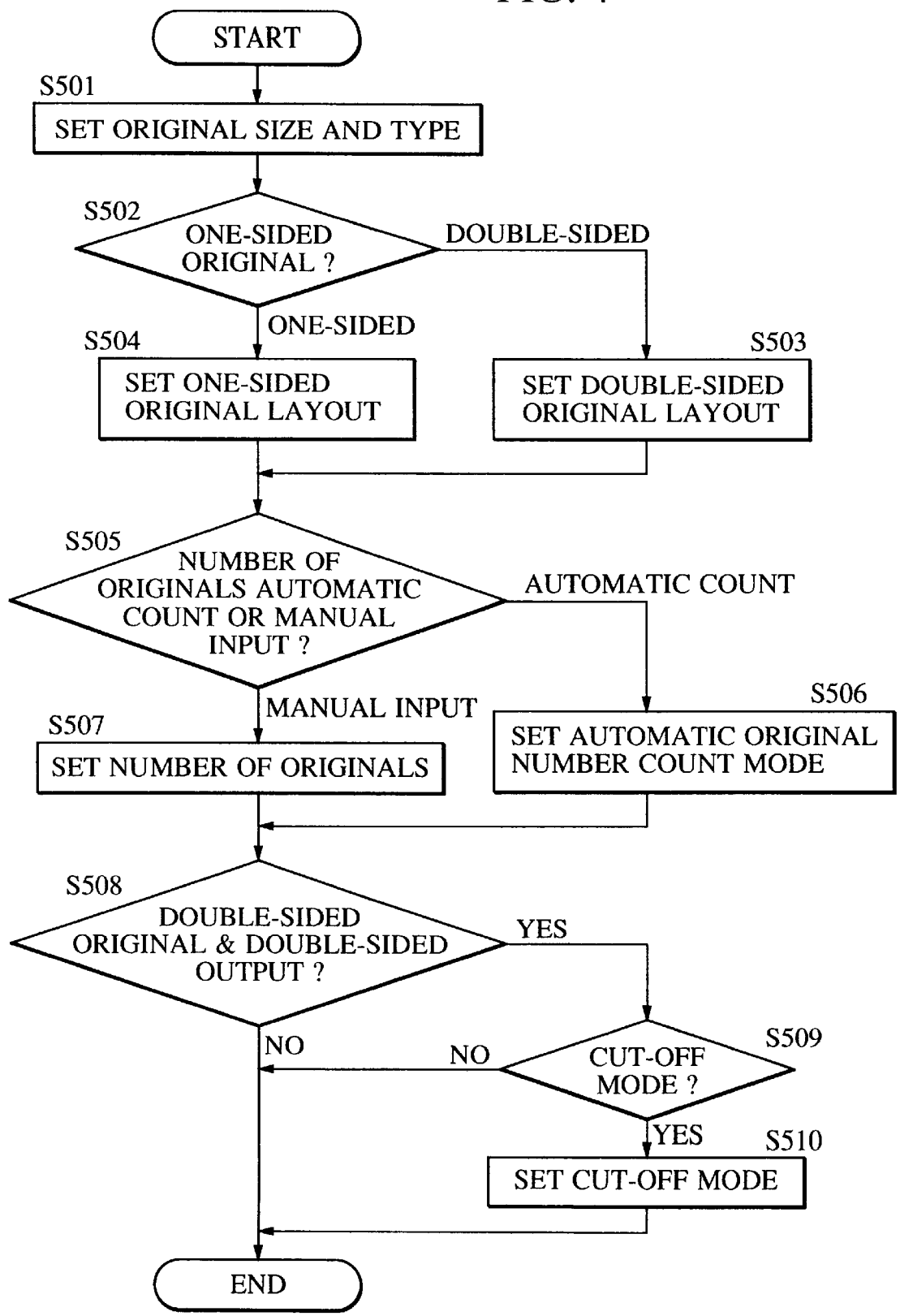
FIG. 4 is a flowchart showing a double-sided image combination mode for a double-sided original.

FIG. 4 is a flowchart showing a routine for setting a double-sided image combination mode for double-sided originals. This image combination mode performs synthetic recording of multiple original images at different positions on a single recording sheet in reduced size. First, the size and type (one-sided or double-sided) of originals to be subjected to image combination are set (Step S501). Next it is determined whether the set originals are double-sided or one-sided (Step S502). If the originals are one-sided, a one-sided original layout setting is made (Step S504). On the other hand, if the originals are double-sided, a double-sided original layout setting is made (Step S503). In making this determination, if an automatic document feeder is not mounted on the image copying apparatus, the process automatically proceeds to Step S504.

The choice between automatic counting or manual input of the number of originals is determined (Step S505). If the number of originals is to be automatically counted by the automatic document feeder, an automatic original count mode is selected (Step S506). On the other hand, when the number of originals is to be input manually, the number of originals is set (Step S507). If the automatic document feeder is not mounted on the image copying apparatus in this choice, the process automatically proceeds to Step S507.

It is next determined whether or not a setting is made to produce a double-sided output of double-sided originals (Step S508). If it is, it is further judged whether or not a cut-off layout mode is selected (Step S509). On the other hand, if other settings than the double-sided output of double-sided originals are made, this routine is ended.

The judgment of the cut-off layout mode in Step S509 means the choice whether to cut the recording sheet into pieces corresponding to respective images after image combination. When the recording sheet is to be cut, the cut-off layout mode is set (Step S510) and the routine is ended. If the cut-off layout mode is not selected, the routine is ended.

Cut-Off Layout Copying Operation

FIG. 5 is an explanatory view showing a state of copy images stored in the image memory 35 in a cut-off layout mode. FIG. 5(A) shows a layout of copy images of first and second originals to be made on the front and rear sides of a recording sheet in a two-original cut-off layout mode. Images on the front and rear sides of each original are recorded at corresponding positions on the front and rear sides of the recording sheet.

First, the first and second originals are set on the automatic document feeder, and the rear side of the second original is transported onto the document platen glass 2 for exposure, and read by the scanner 3. An image on the rear side of the second original is reduced in size, and stored at a position "rear layout 2" in the image memory 35.

Next, the second original is turned upside down by using the automatic document feeder, transported onto the document platen glass 2 so that the front side thereof is exposed, and read by the scanner 3. Then, an image on the front side of the second original is reduced in size and stored at a position "front layout 2" in the image memory 35.

Subsequently, the second original is returned from the document platen glass 2 to a document stack position of the automatic document feeder, and the first original is transported onto the document platen glass 2 so that the rear side thereof is exposed, and read by the scanner 3. An image on the rear side of the first original is reduced in size, and stored at a position "rear layout 1" in the image memory 35.

Then, the first original is turned upside down by using the automatic document feeder, transported onto the document platen glass 2 so that the front side thereof is exposed, and read by the scanner 3. An image on the front side of the first original is reduced in size and stored at a position "front layout 1" in the image memory 35.

While the first original is returned from the document platen glass 2 to the document stack position of the automatic document feeder after being read by the scanner 3, the rear layout images stored in the image memory 35 are recorded onto a recording sheet by the image recording unit 34. The recording sheet is transported to the double-sided sheet conveyor devices through the fixing device 17. Then, the front layout images stored in the image memory 35 are recorded onto the opposite side of the recording sheet by the image recording unit 34, and the recording sheet is ejected from the apparatus after passing through the fixing device 17.

Figure 5A:
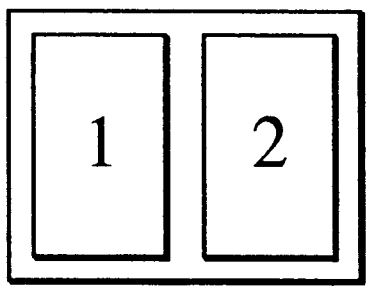
FIGS. 5(A) and 5(B) are explanatory views depicting information in the image memory of FIG. 2 in a cut-off layout mode for two and four originals, respectively.
Figure 5A:
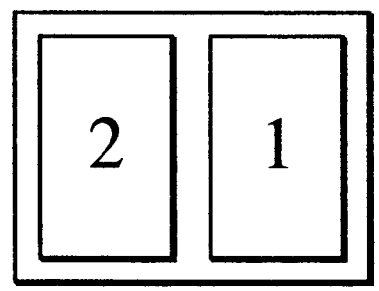
Figure 5B:
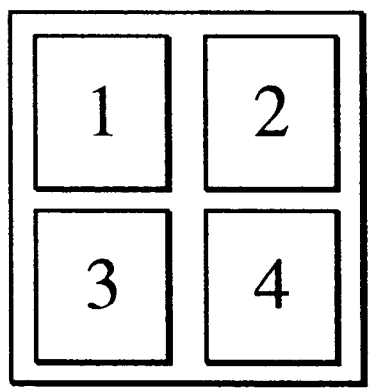
Figure 5B:
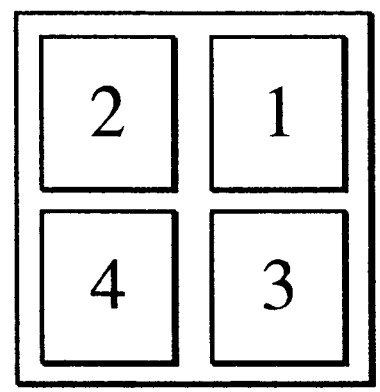

FIG. 5(B) shows a layout of image data when four originals, first, second and third and fourth, are used in a four original cut-off layout mode. First, the rear side of the fourth original is transported onto the document platen glass 2 for exposure by the automatic document feeder, and read by the scanner 3. An image on the rear side of the fourth original is reduced in size, and stored at a position "rear layout 4" in the image memory 35.

Next, the fourth original is turned upside down by using the automatic document feeder, transported onto the document platen glass 2 so that the front side thereof is exposed, and read by the scanner 3. An image on the front side of the fourth original is reduced in size, and stored at a position "front layout 4" in the image memory 35. After that, the fourth original is returned from the document platen glass 2 to the document stack position of the automatic document feeder.

Subsequently, the rear side of the third original is transported onto the document platen glass 2 for exposure, and read by the scanner 3. An image on the rear side of the third original is reduced in size.and stored at a position "rear layout 3" in the image memory 35.

The third original is turned upside down by the automatic document feeder, transported onto the document platen glass 2 so that the front side thereof is exposed, and read by the scanner 3. An image on the front side of the third original is reduced in size and stored at a position "front layout 3" in the image memory 35.

Furthermore, the rear side of the second original is transported for exposure onto the document platen glass 2 and read by the scanner 3. An image on the rear side of the second original is reduced in size, and stored at a position "rear layout 2" in the image memory 35.

The second original is turned upside down by the automatic document feeder, transported onto the document platen glass 2 so that the front side thereof is exposed, and read by the scanner 3. An image on the front side of the second original is reduced in size and stored at a position "front layout 2" in the image memory 35.

Then, the rear side of the first original is transported for exposure onto the document platen glass 2, and read by the scanner 3. An image on the rear side of the first original is reduced in size and stored at a position "rear layout 1" in the image memory 35.

The first original is turned upside down by the automatic document feeder, transported onto the document platen glass 2 so that the front side thereof is exposed, and read by the scanner 3. An image on the front side of the first original is reduced in size, and stored at a position "front layout 1" in the image memory 35.

After that, while the first original is being returned from the document platen glass 2 to the document stack position of the automatic document feeder, the rear layout images stored in the image memory 35 are recorded onto a recording sheet by the image recording unit 34. After the recording sheet is transported to the double-sided sheet conveyor devices through the fixing device 17, the front layout images stored in the image memory 35 are recorded on the opposite side of the recording sheet by the image recording unit 34. Then, the recording sheet is ejected outside the apparatus through the fixing device 17.

Figure 6A:
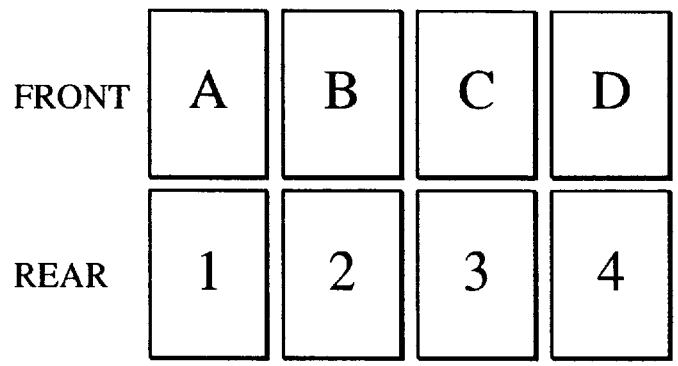
FIGS. 6(A), 6(B) and 6(C) are explanatory views showing three respective copy examples of four double-sided originals in the cut-off layout mode.
Figure 6B:
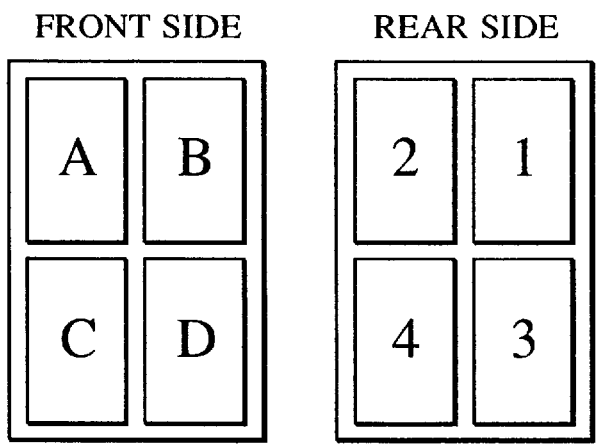
Figure 6C:
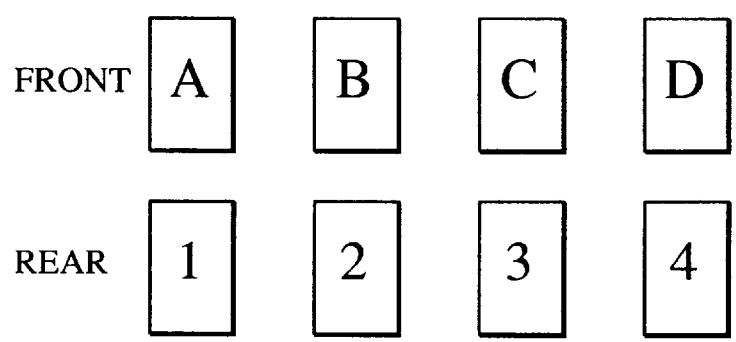

FIG. 6 is an explanatory view showing a copy example of four double-sided originals in a cut-off layout mode. FIG. 6(A) shows four double-sided originals, FIG. 6(B) shows copy images made on both sides of a recording sheet, and FIG. 6(C) shows a state in which the recording sheet is cut into pieces corresponding to the respective copy images.

Figure 7A:
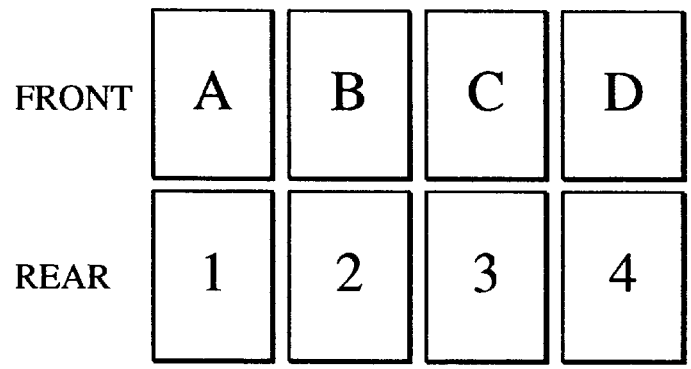
FIGS. 7(A), 7(B) and 7(C) are explanatory views showing three respective copy examples in a normal image combination layout mode without carrying out a cut-off layout mode.
Figure 7B:
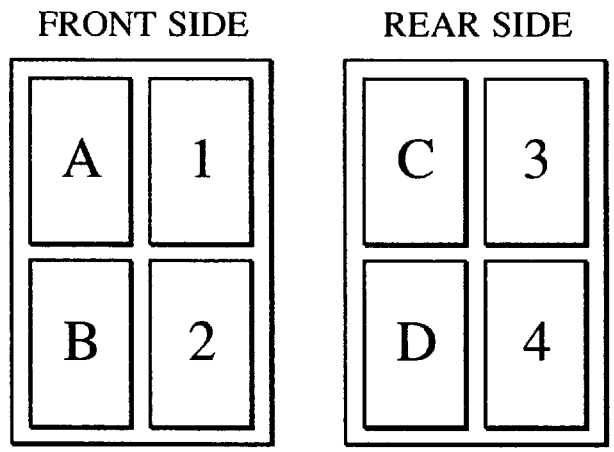
Figure 7C:
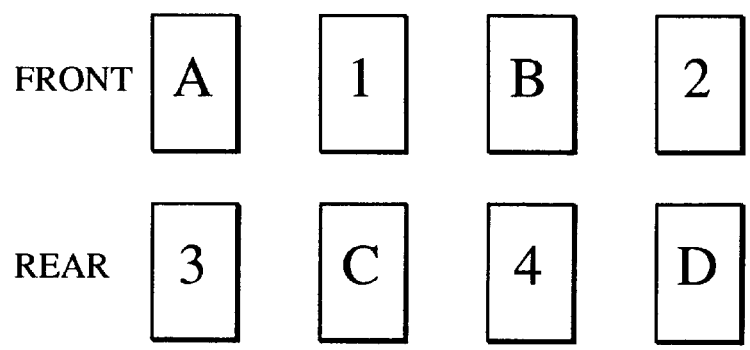

FIG. 7 is an explanatory view showing a copy example of four double-sided originals in a normal image combination mode in which a cut-off layout mode is not performed. FIG. 7(A) shows four double-sided originals, FIG. 7(B) shows copy images recorded on both sides of a recording sheet, and FIG. 7(C) shows a state in which the recording sheet is cut into pieces corresponding to the respective copy images.

In the normal image combination mode, as shown in FIG. 7(C), when the recording sheet is cut into pieces corresponding to respective copy images, copy images on both sides of each cut piece do not agree with images on both sides of each original. However, in the cut-off layout mode shown in FIG. 6(C), images on both sides of each cut piece agree with images on both sides of each original.

The copy magnification ratio in the above-mentioned image combination is determined by the number of images to be recorded on one side of a recording sheet, the size of the recording sheet, and the size of an original.

The original size is detected by the automatic document feeder or the image reading unit 31, and the recording sheet size is detected by the image recording unit 34.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A copying apparatus comprising:
   document feeding means for transporting multiple original documents to an exposure position;
   reading means for reading images of front and rear sides of the original documents at the exposure position;
   a memory for storing the images read by said reading means;
   image forming means for recording onto both sides of a recording sheet the images stored in said memory; and
   determining means for determining layouts of the images of the front and rear sides of the multiple originals on the recording sheet so that images of the front and rear sides of each of the multiple originals are respectively recorded at corresponding positions of the recording sheet back to back with each other, and so that the images of the front side of the originals are composed and recorded on the front side of the sheet and the images of the rear side of the originals are composed and recorded on the rear side of the sheet.

2. A copying apparatus according to claim 1, further comprising processing means for reducing in size the images read by said reading means, wherein the images stored by said memory have been reduced in size.

3. A copying apparatus according to claim 1, wherein said memory has an area for storing images to be recorded on the front side of the recording sheet and an area for storing images to be recorded on the rear side of the recording sheet.

4. An apparatus according to claim 1, wherein said document feeding means includes means for turning each original document upside down.

5. A copying apparatus according to claim 4, wherein said document feeding means transports the original so that the rear side thereof is exposed, and then, transports the original so that the front side thereof is exposed.

6. A copying method comprising the steps of:

sequentially transporting multiple two-sided originals to an image reading station for reading of images on the front and rear sides of said multiple originals;

reading images on the front and rear sides of the transported originals;

storing in a memory the read images of the front and rear sides of the originals;

determining layouts of the images of the front and rear sides of the multiple originals stored in said memory so that the images on the front and rear sides of the multiple originals are recorded at corresponding positions on the front and rear sides of a recording sheet back to back with each other, and so that the images of the front side of the originals are composed and recorded on the front side of the sheet and the images of the rear side of the originals are composed and recorded on the rear side of the sheet; and recording the images stored in said memory onto the front and rear sides of the recording sheet according to the determined layouts.

7. A copying method according to claim 6, further comprising the step of reducing the read images in size, wherein said storing step stores the reduced images.

8. A copying method according to claim 6, wherein said transport step transports each of the originals so that the rear side thereof is read, and thereafter transports the original so that the front side thereof is read.

9. An image forming apparatus comprising:

generating means for generating images of front and rear sides of multiple original documents;

a memory for storing the images generated by said generating means;

image forming means for recording onto both sides of a recording sheet the images stored in said memory; and determining means for determining layouts of the images of the front and rear sides of the multiple originals on the recording sheet so that images of the front and rear sides of each of the multiple originals are respectively recorded at corresponding positions of the recording sheet back to back with each other, and so that the images of the front side of the originals are composed and recorded on the front side of the sheet and the images of the rear side of the originals are composed and recorded on the rear side of the sheet.

10. An image forming method comprising the steps of:

generating images of front and rear sides of multiple originals;

storing in a memory the generated images of the front and rear sides of the originals;

determining layouts of the images of the front and rear sides of the multiple originals stored in said memory so that the images on the front and rear sides of the multiple originals are recorded at corresponding positions on the front and rear sides of a recording sheet back to back with each other, and so that the images of the front side of the originals are composed and recorded on the front side of the sheet and the images of the rear side of the originals are composed and recorded on the rear side of the sheet; and recording the images stored in said memory onto the front and rear sides of the recording sheet according to the determined layouts.

* * * * *